Figure 1:
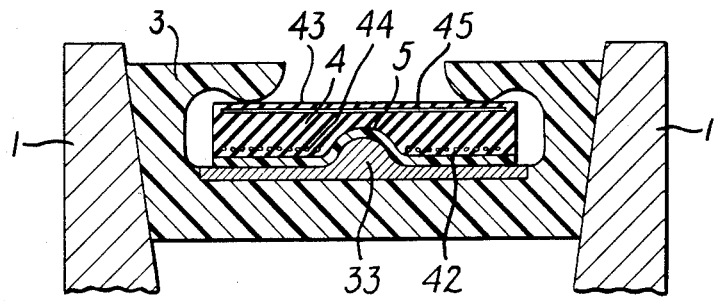

United States Patent [19]

Schneider

[11] Patent Number: 4,501,578
[45] Date of Patent: Feb. 26, 1985

[54] RIDERS FOR TRAPEZOIDAL DRIVE BELT

[75] Inventor: Andre Schneider, Wallisellen, Switzerland

[73] Assignee: Compagnie Generale des Etablissements Michelin, Clermont-Ferrand, France

[21] Appl. No.: 549,541

[22] Filed: Nov. 4, 1983

[30] Foreign Application Priority Data

Nov. 18, 1982 [FR] France .................. 82 19480

[51] Int. Cl.³ ............................. F16G 1/00
[52] U.S. Cl. ..................... 474/201; 474/242
[58] Field of Search ........... 474/201, 242, 244, 245

[56] References Cited

U.S. PATENT DOCUMENTS 2,322,466  6/1943  Perry .................. 474/242
2,638,007  5/1953  Reeves ................. 474/244
3,720,113  3/1973  Van Doorne et al. ...... 474/242

FOREIGN PATENT DOCUMENTS 2465125  3/1981  France ................. 474/242

Primary Examiner—James A. Leppink
Assistant Examiner—Frank H. McKenzie, Jr.
Attorney, Agent, or Firm—Brumbaugh, Graves, Donohue & Raymond

[57] ABSTRACT

A drive belt of trapezoidal cross-section is formed essentially of a nonextendible core, which is closed on itself and has a longitudinal groove, and of an assembly of independent riders which are substantially noncompressible in longitudinal direction and are mounted on the core and have a protuberance of corresponding shape housed permanently within the longitudinal groove.

13 Claims, 4 Drawing Figures

RIDERS FOR TRAPEZOIDAL DRIVE BELT

The invention relates to drive belts whose cross-section has a substantially trapezoidal outer contour and which are formed essentially, on the one hand, of at least one flexible core closed on itself which is substantially nonextendible in the longitudinal direction of the belt and is optionally provided with an inner reinforcement and, on the other hand, of an assembly of independent riders which are substantially noncompressible in the longitudinal direction of the belt and are mounted on the core.

Such belts are adapted to be used dry, for instance, in certain infinitely variable speed regulators which operate by the spreading apart of pulleys having conical flanges. In these regulators, the drive torque is transmitted essentially by compression of the riders against each other between the flanges of the pulleys and along the flattened annular core. Longitudinal sliding takes place between the core and the riders. In order to permit this movement, a certain amount of clearance is provided between the core and the riders. The inner face of the core is frequently in contact with the riders, particularly in the regions where the belt is engaged between the flanges of the pulleys. This clearance in particular permits transverse backward and forward movement of the core with respect to the riders. These relative movements produce friction, heating and wear of the portions of the core which come into contact with the riders.

The technique of the manufacture of the core (which is a flat belt) makes it possible to minimize the wear of the inner face of the core. However, the protection of the sides requires individual treatment of each core, for instance, by covering the core with a protective fabric which adheres to the core.

In French Patent Application No. 82/09629, filed on June 1, 1982 (which corresponds to U.S. application Ser. No. 496,184, filed May 19, 1983), it is proposed that the invididual protection of the sides of the core at the time of the manufacture of the core be eliminated by avoiding the relative transverse backward and forward movement of the core within the riders, which movement is the major cause of the wear of the two lateral faces or sides of the core. This is done by providing on at least one of the inner or outer faces of the core at least one longitudinal rib which is permanently housed within a corresponding cutout in each rider.

Experience shows that when a core of the type described above is used, the longitudinal rib or ribs constitute a local increase of thickness and therefore of flexural moment of inertia and the deformations of the inner and outer faces, which increase, furthermore, cause undesirable heating of the core in the event that the latter contains one or more hysteretic materials.

The object of the invention is to improve further the life of the core by increasing its flexibility while decreasing its hysteresis loss.

The solution consists in providing a drive belt, the cross-section of which has a substantially trapezoidal outer contour, formed essentially of at least one flexible possibly hysteretic core, which is closed on itself and is substantially nonextendible in the longitudinal direction of the belt, and of an assembly of independent riders which are substantially noncompressible in the longitudinal direction of the belt and are mounted on the core, characterized by the fact that at least one of the inner or outer faces of the core, seen in crosss-section, has at least one continuous cutout in the longitudinal direction of the belt, by the act that at least one portion of the riders has a protuberance of corresponding shape housed permanently within the cutout, and by the fact that the core optionally has a longitudinal and/or transverse reinforcement, as known per se.

Thus, the cutout in the core and the corresponding protuberance of the riders in accordance with the invention assure transverse guidance of the riders on the core, avoiding mutual transverse backward and forward movements and therefore harmful contacts between these riders and the sides of the core.

The cutout in accordance with the invention is a continuous longitudinal groove arranged in the body of the core and open either only on a single inner or outer face of the core or simultaneously on one face and one side of the core.

The cutout is also preferably arranged in the inner face of the core. The production and arrangement of the protuberance of the riders which is to be housed within the cutout is thus facilitated.

The belt core of the invention advantageously has a longitudinal reinforcement (wires, cables, filaments or fibers) which occur in developing its nonextendible nature, the reinforcement being arranged as close as possible to the inner face of the core, and/or it has transverse reinforcement which concurs in developing its transverse stiffening and is arranged as close as possible to the outer face of the core.

Another preferred variant of the invention consists in interrupting the longitudinal reinforcement in the region of the cutout in the core. This makes it possible to minimize locally the thickness of the core and to increase the effectiveness of the transverse guidance in accordance with the invention.

The invention may advantageously be combined with one of the following arrangements. They, on the one hand, further decrease the desctructive friction and therefore the heating of the parts moving relative to each other while, on the other hand, the reduce the noise but they also make it possible, with respect to the last two, furthermore, to separate the transverse guidance function from the drive function of the movement of the riders.

In a first combination, the core and the riders are formed essentially of a reinforced or nonreinforced rubber-like or plastic material; the protuberance of the riders which is housed within the cutout in the core is formed of a metal, at least along the surface of the protuberance in contact with the cutout; and the cutout in the core, at least in the portion thereof in contact with the protuberance of the riders, is formed of a rubber-like or plastic material of high resistance to compression and wear in contact with the metal of the protuberance of the riders.

In the second combination, the core is formed essentially of a reinforced or nonreinforced rubber-like or plastic material; the riders are formed essentially of a metal; the cutout in the core, at least in the portion thereof in contact with the protuberance of the riders, is formed of a rubber-like or plastic material of high resistance to compression and wear in contact with the metal of the riders; and the outer faces of the riders, at least in the portions thereof in contact with pulley flanges, are formed of a rubber-like or plastic material of high resistance to compression and wear in contact with metal of the pulley flanges.

In a third combination, the core is formed essentially of a reinforced or nonreinforced rubber-like or plastic material; the riders are formed of two consecutive elements arranged one behind the other in the longitudinal direction, locked with respect to each other in the transverse direction of the belt; the first element is spaced from the core, has its outer faces in contact with pulley flanges, and, at least with respect to these outer faces, is formed of a rubber-like or plastic material of high resistance to compression and wear in contact with metal of the pulley flanges; the second element is spaced from the pulley flanges, has the protuberance housed within the cutout of the core and, at least with respect to this protuberance, is formed of a metal; and the cutout in the core, at least in the portion thereof in contact with the protuberance of the second element of the riders, is formed of a rubber-like or plastic material of high resistance to compression and wear in contact with the metal of the second element.

In a fourth combination, which is a variant of the preceding one, the first element of the riders is formed of a rubber-like or plastic material of high resistance to compression and wear in contact with the metal of the pulley flanges; the second element is formed of a metal; and the cutout in the core is formed of a rubber-like or plastic material of high resistance to compression and wear in contact with the metal of the second element.

These riders are preferably arranged one behind the other on the core in such a manner that the first elements alternate with the second elements.

Illustrative embodiments of the invention are described in the following description given with reference to FIGS. 1–4 of the drawing which show the cross-sections of four variant embodiments of the drive belts of the invention.

The drive belt shown in cross-section in FIG. 1 is formed essentially, on the one hand, of a core 4 which is made practically nonextendible longitudinally by means of a ply of longitudinal wires 44. The belt, on the other hand, is formed of an assembly of riders, such as 3. The inner face 42 of the core 4 is in contact with the rider 3 and, in accordance with the invention, has a longitudinal groove 5 which is arranged in the body of the core 4 and opens onto the inner face 42. According to the invention, the rider 3 has on its inside a protuberance 33 of metal, the surface of which in contact with the core 4 snugly fits the transverse profile of the groove 5.

The outside of the core 4 of the invention and in particular the outside of the groove 5 in contact with the metal protuberance 33 (steel) of the rider 3 are formed, for instance, of polyamide fabric, which materials have a high resistance to compression and wear in contact with the protuberance 33. As to the rider 3, it is formed, for instance, of polyester or polyamide, which materials have a high resistance to compression and wear in contact with the metal of the pulley flanges 1.

In accordance with preferred arrangements of the invention, the longitudinal reinforcement 44 is arranged as close as possible to the inner face 42 of the core 4 and is interrupted in the region taken up by the groove 5 according to the invention. The reinforcement of transverse cords 45, on the other hand, is arranged as close as possible to the outer face 43 of the core 4.

Figure 2:
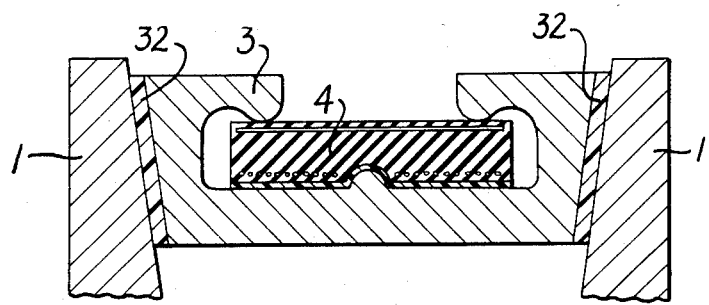

The outside of the core 4 of the drive belt shown in cross-section in FIG. 2 is formed of polyamide fabric, as in the case of FIG. 1.

The rider 3, on the other hand, is of metal, with the exception of its two outer faces 32 in contact with the metal of the pulley flanges 1, which faces are covered, for instance, by polyamide or polyester fabric, which materials have a high resistance to compression and wear in contact with the metal.

Figure 3:
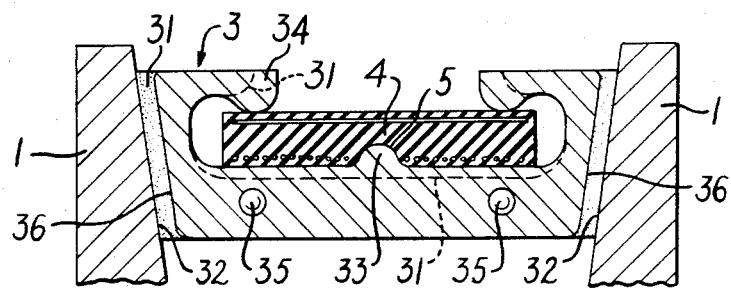

The core 4 of the drive belt shown in cross-section in FIG. 3 is identical to that of the drive belts of FIGS. 1 and 2. Each rider 3 according to the invention, on the other hand, is, in accordance with a preferred arrangement, formed of two elements 31, 34 which are locked together transversely by means of two protrusions 35 from the first element 31 which are positioned in corresponding recesses in the second element 34. As shown in dashed line, the first element 31 is arranged, in FIG. 3, behind the second element 34. The first element 31, in accordance with the preferred arrangement, is set back or spaced from the core 4 and free of any physical contact with it. It has its outer faces 32 in contact with the metal pulley flanges 1. The first element 3 is of a polyamideimide, a material of high resistance to compression and wear in contact with the metal (steel) of the pulley flanges 1. The second element 34, which is of metal (light alloy), has its outer faces 36 set back or spaced from the pulley flanges 1 and is free of physical contact with the latter. It has a protuberance 33 which, in accordance with the invention, is housed within the groove 5 in the core 4. The riders 3 are preferably arranged one behind the other on the core 4 in such a manner that the first elements 31 alternate with the second elements 34.

Figure 4:
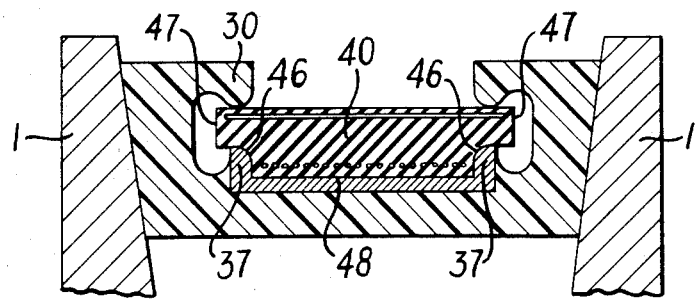

The outside of the core 40 of the drive belt shown in cross-section in FIG. 4 is, like that of the drive belts in FIGS. 1 to 3, of polyamide fabric. This core 40 has, in accordance with the invention, two cutouts 46 which are open simultaneously on the inner face 48 and each one, on one of the sides 47 of the core 40. Each of them (46) produces a thinning of the corresponding sides 47. These two cutouts 46 constitute the housings for the metal protuberances 37 of the plastic rider 30.

What is claimed is:

1. A drive belt, the cross-section of which has a substantially trapezoidal outer contour, formed essentially of at least one flexible possibly hysteretic core having a body and inner and outer faces, which is closed on itself and is substantially nonextendible in the longitudinal direction of the belt, optionally having a longitudinal and/or transverse reinforcement, and of an assembly of independent riders which are substantially noncompressible in the longitudinal direction of the belt and are mounted on the core, characterized by the fact that at least one of the inner or outer faces of the core, seen in cross-section, has at least one continuous cutout in the longitudinal direction of the belt; and at least one portion of the riders has a protuberance of corresponding shape housed permanently within the cutout so that the cutout and protuberance cooperate to assure transverse guidance of the riders on the core.

2. A belt according to claim 1, characterized by the fact that the cutout is a continuous longitudinal groove arranged in the body of the core and open only on a single inner or outer face of the core.

3. A belt according to claim 1, characterized by the fact that the cutout is a continuous longitudinal groove arranged in the body of the core and open simultaneously on one face and one side of the core.

4. A belt according to claim 1, characterized by the fact that the cutout is arranged in the inner face of the core.

5. A belt according to claim 1, characterized by the fact that the transverse reinforcement is arranged as close as possible to the outer face of the core.

6. A belt according to claim 1, characterized by the fact that the longitudinal reinforcement is arranged as close as possible to the inner face of the core.

7. A belt according to claim 5 or 6, characterized by the fact that the reinforcement is interrupted in the region of the cutout.

8. A belt according to claim 3, characterized by the fact that the core has two cutouts each producing a thinning of the corresponding side of the core.

9. A belt according to claim 1, characterized by the fact that the core and the riders are formed essentially of a reinforced or nonreinforced rubber-like or plastic material; the protuberance of the riders which is housed within the cutout in the core is formed of a metal, at least along the surface of the protuberance in contact with the cutout; and the cutout in the core, at least in the portion thereof in contact with the protuberance of the riders, is formed of a rubber-like or plastic material of high resistance to compression and wear in contact with the metal of the protuberance of the riders.

10. A belt according to claim 1, characterized by the fact that the core is formed essentially of a reinforced or nonreinforced rubber-like or plastic material; the riders are formed essentially of a metal; the cutout in the core, at least in the portion thereof in contact with the protuberance of the riders, is formed of a rubber-like or plastic material of high resistance to compression and wear in contact with the metal of the riders; and the outer faces of the riders, at least in the portions thereof in contact with pulley flanges, are formed of a rubber-like or plastic material of high resistance to compression and wear in contact with metal of the pulley flanges.

11. A belt according to claim 1, characterized by the fact that the core is formed essentially of a reinforced or nonreinforced rubber-like or plastic material; the riders are formed of first and second consecutive elements arranged one behind the other in the longitudinal direction, locked with respect to each other in the transverse direction of the belt; the first element is spaced from the core, has its outer faces in contact with pulley flanges, and, at least with respect to these outer faces, is formed of a rubber-like or plastic material of high resistance to compression and wear in contact with metal of the pulley flanges; the second element is spaced from the pulley flanges, has the protuberance housed within the cutout of the core and, at least with respect to this protuberance, is formed of a metal; and the cutout in the core, at least in the portion thereof in contact with the protuberance of the second element of the riders, is formed of a rubber-like or plastic material of high resistance to compression and wear in contact with the metal of the second element.

12. A belt according to claim 11, characterized by the fact that the first element of the riders is formed of a rubber-like or plastic material of high resistance to compression and wear in contact with the metal of the pulley flanges; the second element is formed of a metal; and the cutout in the core is formed of a rubber-like or plastic material of high resistance to compression and wear in contact with the metal of the second element.

13. A belt according to claim 11 or 12, characterized by the fact that the riders are arranged one behind the other on the core in such a manner that the first elements alternate with the second elements.

* * * * *

UNITED STATES PATENT AND TRADEMARK OFFICE
CERTIFICATE OF CORRECTION

PATENT NO. : 4,501,578

DATED : Feb. 26, 1985

INVENTOR(S) : Andre Schneider

It is certified that error appears in the above—identified patent and that said Letters Patent is hereby corrected as shown below:

Col. 2, line 3, "act" should read -- fact--; line 25, "occur" should read -- concur --; line 28, before "transverse" insert -- a --; line 41, "the reduce" should read -- they reduce --.
Col. 4, line 21, "element 3" should read -- element 31 --.

Signed and Sealed this

Eighteenth Day of June 1985

[SEAL]

Attest:

DONALD J. QUIGG

Attesting Officer

Acting Commissioner of Patents and Trademarks